(12) United States Patent
Land et al.

(10) Patent No.: US 9,146,304 B2
(45) Date of Patent: Sep. 29, 2015

(54) OPTICAL PROXIMITY SENSOR WITH AMBIENT LIGHT AND TEMPERATURE COMPENSATION

(75) Inventors: Brian R. Land, Woodside, CA (US); Dong Zheng, Los Altos, CA (US)

(73) Assignee: Apple Inc., Cupertino, CA (US)

(*) Notice: Subject to any disclaimer, the term of this patent is extended or adjusted under 35 U.S.C. 154(b) by 520 days.

(21) Appl. No.: 13/608,973

(22) Filed: Sep. 10, 2012

(65) Prior Publication Data

US 2014/0070078 A1    Mar. 13, 2014

(51) Int. Cl.
| | |
|---|---|
| H04W 52/02 | (2009.01) |
| G01S 7/493 | (2006.01) |
| H04M 1/725 | (2006.01) |
| G01S 17/02 | (2006.01) |
| G01S 17/88 | (2006.01) |
| G01S 7/497 | (2006.01) |

(52) U.S. Cl.
CPC .............. *G01S 7/493* (2013.01); *G01S 7/497* (2013.01); *G01S 17/026* (2013.01); *G01S 17/88* (2013.01); *H04M 1/72522* (2013.01); *H04W 52/0254* (2013.01); *H04M 2250/12* (2013.01); *H04M 2250/22* (2013.01)

(58) Field of Classification Search
CPC .... G01J 1/4204; H05B 37/0218; Y02B 20/46
USPC ................. 250/214 AL, 214 B, 221
See application file for complete search history.

(56) References Cited

U.S. PATENT DOCUMENTS

| | | | |
|---|---|---|---|
| 4,774,564 A | * | 9/1988 | Konishi ........... 348/224.1 |
| 5,095,945 A | | 3/1992 | Jensen et al. |
| 5,103,085 A | | 4/1992 | Zimmerman |
| 5,270,818 A | | 12/1993 | Ottenstein |
| 5,406,305 A | | 4/1995 | Shimomura et al. |

(Continued)

FOREIGN PATENT DOCUMENTS

| | | |
|---|---|---|
| CN | 1581052 | 2/2005 |
| EA | 1355223 | 10/2003 |

(Continued)

OTHER PUBLICATIONS

PCT Search Report mailed Aug. 21, 2008; PCT/US2007/026130.

(Continued)

*Primary Examiner* — Renee D Chavez
(74) *Attorney, Agent, or Firm* — Treyz Law Group; G. Victor Treyz; Joseph F. Guihan (57) ABSTRACT

An electronic device may be provided with a proximity sensor. The proximity sensor may include a light source such as a light-emitting diode and a light detector such as a photodiode. The light-emitting diode may be driven with an alternating current drive signal so that alternating current light is produced. The alternating current light may reflect off of an external object and may be received by the photodiode. The photodiode may receive a direct current light signal associated with the presence of ambient light. The efficiency of the photodiode may be affected by the level of ambient light and the efficiency of the light-emitting diode may be affected by the temperature of the light-emitting diode. Ambient light correction circuitry and temperature correction circuitry may be used to ensure that proximity sensor readings are not adversely affected by changes in operating temperature and ambient lighting conditions.

19 Claims, 6 Drawing Sheets

(56) References Cited

U.S. PATENT DOCUMENTS

| | | |
|---|---|---|
| 5,528,266 A | 6/1996 | Arbeitman et al. |
| 5,684,294 A * | 11/1997 | Kouhi ..................... 250/214 AL |
| 5,786,801 A | 7/1998 | Ichise |
| 5,884,156 A | 3/1999 | Gordon |
| 5,894,298 A | 4/1999 | Hoeksma |
| 5,952,992 A | 9/1999 | Helms |
| 6,157,024 A * | 12/2000 | Chapdelaine et al. ........ 250/221 |
| 6,208,854 B1 | 3/2001 | Roberts et al. |
| 6,246,862 B1 | 6/2001 | Grivas et al. |
| 6,255,784 B1 | 7/2001 | Weindorf |
| 6,289,453 B1 | 9/2001 | Walker et al. |
| 6,373,612 B1 | 4/2002 | Hoffman et al. |
| 6,477,374 B1 | 11/2002 | Shaffer et al. |
| 6,520,013 B1 | 2/2003 | Wehrenberg |
| 6,522,697 B1 | 2/2003 | Spickermann |
| 6,583,676 B2 | 6/2003 | Krah et al. |
| 6,601,012 B1 | 7/2003 | Horvitz et al. |
| 6,664,744 B2 | 12/2003 | Dietz |
| 6,803,920 B2 | 10/2004 | Gossett et al. |
| 6,812,466 B2 | 11/2004 | O'Connor et al. |
| 6,822,635 B2 | 11/2004 | Shahoian et al. |
| 6,947,017 B1 | 9/2005 | Gettemy |
| 6,947,571 B1 | 9/2005 | Rhoads et al. |
| 6,956,564 B1 | 10/2005 | Williams |
| 7,016,705 B2 | 3/2006 | Bahl et al. |
| 7,019,622 B2 | 3/2006 | Orr et al. |
| 7,117,021 B2 | 10/2006 | Shearer et al. |
| 7,117,380 B2 | 10/2006 | Kangas |
| 7,171,221 B1 | 1/2007 | Amin et al. |
| 7,177,664 B2 | 2/2007 | Weinzweig et al. |
| 7,209,719 B2 | 4/2007 | Liebenow |
| 7,522,065 B2 | 4/2009 | Falcon |
| 7,605,693 B2 | 10/2009 | Kulas |
| 7,633,076 B2 | 12/2009 | Huppi et al. |
| 7,714,265 B2 * | 5/2010 | Fadell et al. ............ 250/214 AL |
| 2001/0031633 A1 | 10/2001 | Tuomela et al. |
| 2001/0031645 A1 | 10/2001 | Jarrett |
| 2002/0018050 A1 | 2/2002 | Turner |
| 2002/0019249 A1 | 2/2002 | Kashu et al. |
| 2002/0065099 A1 | 5/2002 | Bjorndahl |
| 2002/0074499 A1 * | 6/2002 | Butler ......................... 250/338.1 |
| 2002/0167488 A1 | 11/2002 | Hinckley et al. |
| 2003/0022666 A1 | 1/2003 | Sato |
| 2003/0022671 A1 | 1/2003 | Huomo et al. |
| 2003/0095096 A1 | 5/2003 | Robbin et al. |
| 2003/0108300 A1 | 6/2003 | Walker et al. |
| 2003/0224726 A1 | 12/2003 | Shearer et al. |
| 2004/0012556 A1 | 1/2004 | Yong et al. |
| 2004/0110472 A1 | 6/2004 | Witkowski et al. |
| 2004/0180649 A1 | 9/2004 | Vogel et al. |
| 2004/0203351 A1 | 10/2004 | Shearer et al. |
| 2004/0213576 A1 | 10/2004 | Tan et al. |
| 2004/0224638 A1 | 11/2004 | Fadell et al. |
| 2004/0233153 A1 | 11/2004 | Robinson |
| 2004/0245438 A1 | 12/2004 | Payne et al. |
| 2005/0057169 A1 | 3/2005 | Noguchi et al. |
| 2005/0132416 A1 | 6/2005 | Wasilewski |
| 2005/0143057 A1 | 6/2005 | Shiraga et al. |
| 2005/0168658 A1 | 8/2005 | Woolgar et al. |
| 2005/0171662 A1 | 8/2005 | Strege et al. |
| 2005/0190142 A1 | 9/2005 | Ferguson |
| 2005/0219223 A1 | 10/2005 | Kotzin et al. |
| 2005/0219228 A1 | 10/2005 | Alameh et al. |
| 2005/0219394 A1 | 10/2005 | Du et al. |
| 2005/0221791 A1 | 10/2005 | Angelhag |
| 2005/0253817 A1 | 11/2005 | Rytivaara et al. |
| 2006/0007107 A1 | 1/2006 | Ferguson |
| 2006/0017692 A1 | 1/2006 | Wehrenberg et al. |
| 2006/0026521 A1 | 2/2006 | Hotelling et al. |
| 2006/0026535 A1 | 2/2006 | Hotelling et al. |
| 2006/0052141 A1 | 3/2006 | Suzuki |
| 2006/0060762 A1 | 3/2006 | Chan et al. |
| 2006/0087245 A1 | 4/2006 | Ng et al. |
| 2006/0097991 A1 | 5/2006 | Hotelling et al. |
| 2006/0116175 A1 | 6/2006 | Chu |
| 2006/0117108 A1 | 6/2006 | Salisbury et al. |
| 2006/0146012 A1 | 7/2006 | Arneson et al. |
| 2006/0161870 A1 | 7/2006 | Hotelling et al. |
| 2006/0161871 A1 | 7/2006 | Hotelling et al. |
| 2006/0164241 A1 | 7/2006 | Makela et al. |
| 2006/0166702 A1 | 7/2006 | Dietz et al. |
| 2006/0197753 A1 | 9/2006 | Hotelling |
| 2006/0199536 A1 | 9/2006 | Eisenbach |
| 2006/0229101 A1 | 10/2006 | LaBauve et al. |
| 2006/0290921 A1 | 12/2006 | Hotelling |
| 2006/0291863 A1 | 12/2006 | Chan et al. |
| 2007/0003289 A1 | 1/2007 | Tan et al. |
| 2007/0042714 A1 | 2/2007 | Ayed |
| 2007/0046629 A1 | 3/2007 | Chi-Boon et al. |
| 2007/0057773 A1 | 3/2007 | Hsieh et al. |
| 2007/0075965 A1 | 4/2007 | Huppi et al. |
| 2007/0085157 A1 | 4/2007 | Fadell et al. |
| 2007/0099574 A1 | 5/2007 | Wang |
| 2007/0123171 A1 | 5/2007 | Slamka et al. |
| 2007/0123287 A1 | 5/2007 | Mock et al. |
| 2007/0135091 A1 | 6/2007 | Wassingbo |
| 2007/0135151 A1 | 6/2007 | Dendy |
| 2007/0161410 A1 | 7/2007 | Huang et al. |
| 2007/0225047 A1 | 9/2007 | Bakos |
| 2007/0233759 A1 | 10/2007 | Tomlinson et al. |
| 2007/0239903 A1 | 10/2007 | Bhardwaj et al. |
| 2007/0266185 A1 | 11/2007 | Goddi et al. |
| 2007/0293188 A1 | 12/2007 | Houghton et al. |
| 2008/0006762 A1 | 1/2008 | Fadell et al. |
| 2008/0031206 A1 | 2/2008 | Sharma |
| 2008/0054391 A1 * | 3/2008 | Apsel et al. .................. 257/462 |
| 2008/0090617 A1 | 4/2008 | Sutardja |
| 2008/0102882 A1 | 5/2008 | Sutardja |
| 2008/0113618 A1 | 5/2008 | De Leon et al. |
| 2008/0192129 A1 | 8/2008 | Walker et al. |
| 2009/0047904 A1 | 2/2009 | Preston et al. |
| 2009/0098865 A1 | 4/2009 | Vaghi et al. |
| 2009/0244092 A1 | 10/2009 | Hotelling |
| 2009/0313473 A1 | 12/2009 | Walker et al. |
| 2011/0234301 A1 | 9/2011 | Gruber |
| 2011/0266446 A1 | 11/2011 | Chang et al. |
| 2012/0025715 A1 | 2/2012 | Picciotto et al. |
| 2012/0119662 A1 | 5/2012 | Radermacher |

FOREIGN PATENT DOCUMENTS

| | | |
|---|---|---|
| EP | 0992969 | 4/2000 |
| EP | 1185058 | 3/2002 |
| EP | 1335430 | 8/2003 |
| EP | 1 445 922 A1 | 8/2004 |
| EP | 1452988 | 9/2004 |
| EP | 1465462 | 10/2004 |
| EP | 1507132 | 2/2005 |
| EP | 1507196 | 2/2005 |
| EP | 1650938 | 4/2006 |
| EP | 1667103 | 6/2006 |
| EP | 1696414 | 8/2006 |
| GB | 2346500 | 8/2000 |
| GB | 2418808 | 4/2006 |
| JP | 05-323277 | 12/1993 |
| JP | 2001244498 | 9/2001 |
| JP | 2001-352395 | 12/2001 |
| JP | 2003-204390 | 7/2003 |
| JP | 2004-021476 | 1/2004 |
| JP | 2004159028 | 6/2004 |
| JP | 2004357193 | 12/2004 |
| JP | 2005-260996 | 9/2005 |
| JP | 2005-278043 | 10/2005 |
| JP | 2007-163872 | 6/2007 |
| WO | WO 00/79766 A1 | 12/2000 |
| WO | WO-2004/093045 | 10/2004 |
| WO | WO-2005/101176 | 10/2005 |
| WO | WO 2005/114369 A2 | 12/2005 |

OTHER PUBLICATIONS

"Apple Inc.", International Preliminary Report on Patentability mailed Jul. 16, 2009; PCT Application No. PCT/US2007/026141.

(56) References Cited

OTHER PUBLICATIONS

"Apple Inc.", International Preliminary Report on Patentability mailed May 28, 2009; PCT Applicaiotn No. PCT/US2007/023124.

"Proximity Sensor Demo Kit User Guide, Version 0.62-Preliminary", Integration Associates, Inc.; 2004, 17 pages.

Agilent Technologies Inc., "Agilent unveils optical sensor for mobile appliances", http:/www.embeddedstar.com/press/content/2004/8/embedded16015.html, (Aug. 31, 2004), 2 pages.

Apple Inc., PCT Search Report mailed Jun. 3, 2008; PCT/US2007/026164.

Apple Inc., International Preliminary Report on Patentability mailed Jul. 16, 2009; PCT Application No. PCT/US2007/026130.

Apple Inc., "PCT Notification of Transmittal of the International Search Report and the Written Opinion of the International Searching Authority", PCT/US2007/022335, (Feb. 18, 2008).

Apple Inc., "PCT Search Report and Written Opinion mailed Jul. 3, 2008", PCT/US2007/023124, 14 pages.

Intel Corp., Non final Office Action mailed Mar. 4, 2011; U.S. Appl. No. 11/650,014.

Kennedy, "Methods and Apparatuses for Configuration Automation", U.S. Appl. No. 10/805,144, 59 pages.

Roos, Gina , "Agilent's new proximity sensor beats the fumble-fingered competition hands down . . . literally", eeProductCenter, URL:http://www.eeproductcenter.com/showArticle.jhtml?articleID_46200544, (Sep. 1, 2004), 3 pages.

Universal Remote Control, Inc., "All Complete Control Remotes Now Use Narrow Band RF", http://www.universalremote.com/corporate/press_release.php?press=13, (2008).

Universal Remote Control, Inc., "MX-950 (The Aurora)", www.unversalremote.com, (2005).

Universal Remote Control, Inc., "Operating System with the Aurora MX-950", MX-950 Owners Manual, (2005).

Supplemental European Search Report mailed Apr. 21, 2011 for EP Appln No. 07863192.6.

IrDA Physical Layer Implementation for Hewlett Pacards Infrared Products.

International Preliminary Report on Patentability, Jul. 7, 2009; PCT Application No. PCT/US2007/026164.

International Preliminary Report on Patentability, Apr. 28, 2009; PCT Application No. PCTUS2007/022335.

CNET News.com, "Reinventing the Scroll Wheel", Photo 1, http://news.com/2300-1041 361079511.html?tag=ne.gall.pg (Aug. 22, 2006).

CNET News.com, "Reinventing the Scroll Wheel", Photo 2, http://news.com/2300-1041 3-6107951-2.html?tag=ne.gall.pg, (Aug. 22, 2006).

CNET News.com, "Reinventing the Scroll Wheel", Photo 3, http://news.com/2300-1041 3-6107951-3.html?tag=ne.gall.pg, Aug. 22, 2006).

CNET News.com, "Reinventing the Scroll Wheel", Photo 4, http://news.com/2300-1041 3-6107951-4.html?tag=ne.gall.pg, (Aug. 22, 2006).

CNET News.com, "Reinventing the Scroll Wheel", Photo 5, http://news.com/2300-1041 3-6107951-5.html?taci=ne.gall.pg, (Aug. 22, 2006).

CNET News.com, "Reinventing the Scroll Wheel", Photo 6, http://news.com/2300-1041 3-6107951-6.html?tag=ne.gall.pg, (Aug. 22, 2006).

CNET News.com, "Reinventing the Scroll Wheel", Photo 7, http://news.com/2300-1041 3-6107951-7.html?tag=ne.gall.pg, (Aug. 22, 2006).

CNET News.com, "Reinventing the Scroll Wheel", Photo 8, http://news.com/2300-1041 3-6107951-8.html?ta.q=ne.gall.pg, (Aug. 22, 2006).

\* cited by examiner

OPTICAL PROXIMITY SENSOR WITH AMBIENT LIGHT AND TEMPERATURE COMPENSATION

BACKGROUND

This relates generally to electronic devices and, more particularly, to electronic devices with proximity sensors.

Electronic devices such as cellular telephones are sometimes provided with proximity sensors. For example, a cellular telephone may be provided with a proximity sensor that is located near an ear speaker on a front face of the cellular telephone. The front face of the cellular telephone may also contain a touch screen display. The proximity sensor may be used to determine when the cellular telephone is near to the head of a user. When not in proximity to the head of the user, the cellular telephone may be placed in a normal mode of operation in which the touch screen display is used to present visual information to the user and in which the touch sensor portion of the touch screen is enabled. In response to determining that the cellular telephone has been brought into the vicinity of the user's head, the display may be disabled to conserve power and the touch sensor on the display may be temporarily disabled to avoid inadvertent touch input from contact between the user's head and the touch sensor.

A proximity sensor for use in a cellular telephone may be based on an infrared light-emitting diode and a corresponding infrared photodiode. During operation, the light-emitting diode may emit infrared light outwards from the front face of the cellular telephone. The emitted light may be reflected from external objects such as the head of a user. When the cellular telephone is not in the vicinity of a user's head, the infrared light will not be reflected towards the photodiode and only small amounts of reflected light will be detected by the photodiode. When the cellular telephone is adjacent to the user's head, the emitted light from the infrared light-emitting diode will be reflected from the user's head and detected by the photodiode.

To reduce the impact of ambient light on the operation of a light-based proximity sensor, an alternating current (AC) signal may be used in driving the light-emitting diode. Corresponding detected signals from the photodiode detector may be filtered to separate direct current (DC) signals that are produced when ambient light illuminates the photodetector from the AC proximity sensor signal associated with the light-emitting diode.

Although DC signals can be filtered out of the photodetector signal, the performance of the photodetector in receiving the AC proximity sensor signal may be influenced by the magnitude of the DC signals. Temperature changes can also affect photodetector performance and light-emitting diode performance. Light-emitting diode current-to-optical-power conversion efficiency tends to decrease with increasing temperature and photodetector light-to-electrical current conversion efficiency tends to increase with increasing DC current from ambient light exposure. Environmental factors such as changes in ambient temperature and changes in ambient light exposure may therefore have an adverse impact on the accuracy of proximity sensor measurements.

It would therefore be desirable to be able to provide proximity sensors with enhanced immunity to environmental effects.

SUMMARY

An electronic device may be provided with a proximity sensor. The proximity sensor may include a light source such as an infrared light-emitting diode and a light detector such as a photodiode. The light-emitting diode may be driven with an alternating current drive signal so that an alternating current proximity sensor light signal is produced. The proximity sensor light may reflect off of an external object and may be received by the photodiode. The photodiode may also receive a direct current light signal due to the presence of ambient light.

Proximity sensor circuitry may process photodiode signals from the photodiode. The proximity sensor circuitry may include a transimpedance amplifier for converting current signals from the photodiode into a voltage signal. First and second circuit branches may be connected to the output of the amplifier. The first circuit branch may include a low pass filter for extracting a direct current component of the voltage that is representative of the amount of ambient light that is received by the photodiode. The second circuit branch may include a high pass filter for extracting an alternating current proximity sensor component of the voltage that is representative of the alternating current proximity sensor light signal.

The second branch may include an analog-to-digital converter and demodulator for converting the extracted alternating current component of the voltage into a digital uncorrected photodiode signal. The first branch may include an efficiency correction factor generator. The efficiency correction factor generator may generate a correction factor based on a digital version of the extracted direct current component of the voltage.

An ambient light correction circuit may receive the uncorrected photodiode signal from the first branch and may apply the correction factor to correct the photodiode signal for efficiency changes due to fluctuations in ambient light level. Temperature corrections may be made using a temperature correction circuit that receives input from a temperature sensor.

Further features of the invention, its nature and various advantages will be more apparent from the accompanying drawings and the following detailed description of the preferred embodiments.

DETAILED DESCRIPTION

An electronic device may use one or more proximity sensors to detect external objects such as the head of a user. As an example, an electronic device may use an infrared-light-based proximity sensor to gather proximity data. During operation, proximity data from the proximity sensor may be used to determine whether or not the electronic device is near to the user's head so that the electronic device can take appropriate action. The electronic device may, for example, deactivate touch screen functionality in a display when it is determined that the device is adjacent to the user's head.

A light-based proximity sensor may be used that includes a light source such as an infrared light-emitting diode and a light detector such as a photodiode. To ensure accurate proximity sensor operation, correction circuitry can be included within the processing circuitry that is used to handle signals from the photodiode. The correction circuitry may be used to correct (compensate) the signals from the photodiode for changes in light-emitting diode and photodetector efficiency due to changed operating conditions, thereby minimizing inaccuracies due to environmental effects such as temperature fluctuations and ambient light fluctuations.

Figure 1:
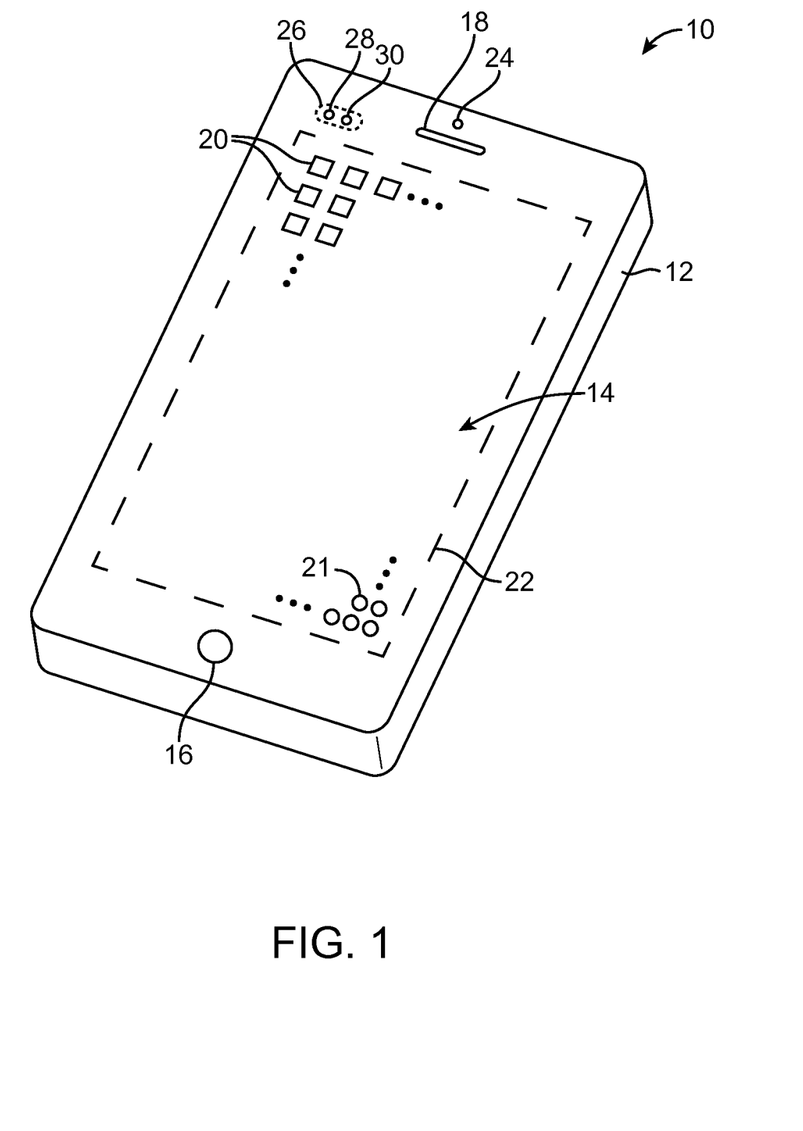
FIG. 1 is a perspective view of an illustrative electronic device with a proximity sensor in accordance with embodiments of the present invention.

An illustrative electronic device that may be provided with a proximity sensor that has correction circuitry is shown in FIG. 1. Electronic devices such as device 10 of FIG. 1 may be cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes such as electrodes 20 or other touch sensor components (e.g., resistive touch sensor components, acoustic touch sensor components, force-based touch sensor components, light-based touch sensor components, etc.) or may be a display that is not touch-sensitive. Capacitive touch screen electrodes 20 may be formed from an array of indium tin oxide pads or other transparent conductive structures.

Display 14 may include an array of display pixels such as pixels 21 formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by display pixels 21) and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14 (e.g., in the portion of display 14 within rectangular region 22 of FIG. 1), display 14 may contain an array of active display pixels such as pixels 21. Region 22 may therefore sometimes be referred to as the active region of display 14. The rectangular ring-shaped region that surrounds the periphery of active display region 22 may not contain any active display pixels and may therefore sometimes be referred to as the inactive region of display 14. The display cover layer or other display layers in display 14 may be provided with an opaque masking layer in the inactive region to hide internal components from view by a user. Openings may be formed in the opaque masking layer to accommodate light-based components. For example, an opening may be provided in the opaque masking layer to accommodate an ambient light sensor such as ambient light sensor 24.

If desired, an opening in the opaque masking layer may be filled with an ink or other material that is transparent to infrared light but opaque to visible light. As an example, light-based proximity sensor 26 may be mounted under this type of opening in the opaque masking layer of the inactive portion of display 14.

Light-based proximity sensor 26 may include a light transmitter such as light source 28 and a light sensor such as light detector 30. Light source 28 may be an infrared light-emitting diode and light detector 30 may be a photodetector based on a transistor or photodiode (as examples). Examples of proximity sensors that are based on photodiodes are sometimes described herein as an example. Other types of proximity sensor may be used if desired. During operation, proximity sensor detector 30 may use the photodiode or other light detector to gather light from source 28 that has reflected from nearby objects. By using correction circuitry in processing photodiode signals from the light detector in the proximity sensor, proximity sensing operations can be provided with enhanced immunity to environmental variables such as temperature and ambient light conditions.

Proximity sensor 26 may detect when a user's head, a user's fingers, or other external object is in the vicinity of device 10 (e.g., within 5 cm or less of sensor 26, within 1 cm or less of sensor 26, or within other suitable distance of sensor 26).

During operation of device 10, proximity sensor data from proximity sensor 26 may be used in controlling the operation of device 10. For example, when proximity sensor measurements from sensor 26 indicate that device 10 is in the vicinity of the user's head (and that the user's head is in the vicinity of device 10), device 10 can be placed in a close proximity mode. When operating in the close proximity mode, the functionality of device 10 can be altered to ensure proper operation of device 10. For example, touch screen input can be temporarily disabled so that touch events related to contact between the user's head and one or more of capacitive touch sensor electrodes 20 can be ignored. Display brightness can also be turned down partly or fully by disabling a backlight in device 10 or by otherwise temporarily disabling display pixels 21, thereby conserving power. In the event that proximity sensor data indicates that device 10 and the user's head are not adjacent to each other, (e.g., when it is determined that device 10 is more than 1 cm from the user's head, is more than 5 cm from the user's head, etc.), device 10 can be placed in a normal (non-close-proximity) operating mode. Other operations may be controlled in device 10 based on proximity sensor data from proximity sensor 26. The use of proximity sensor data to control display functions is merely illustrative.

Figure 2:
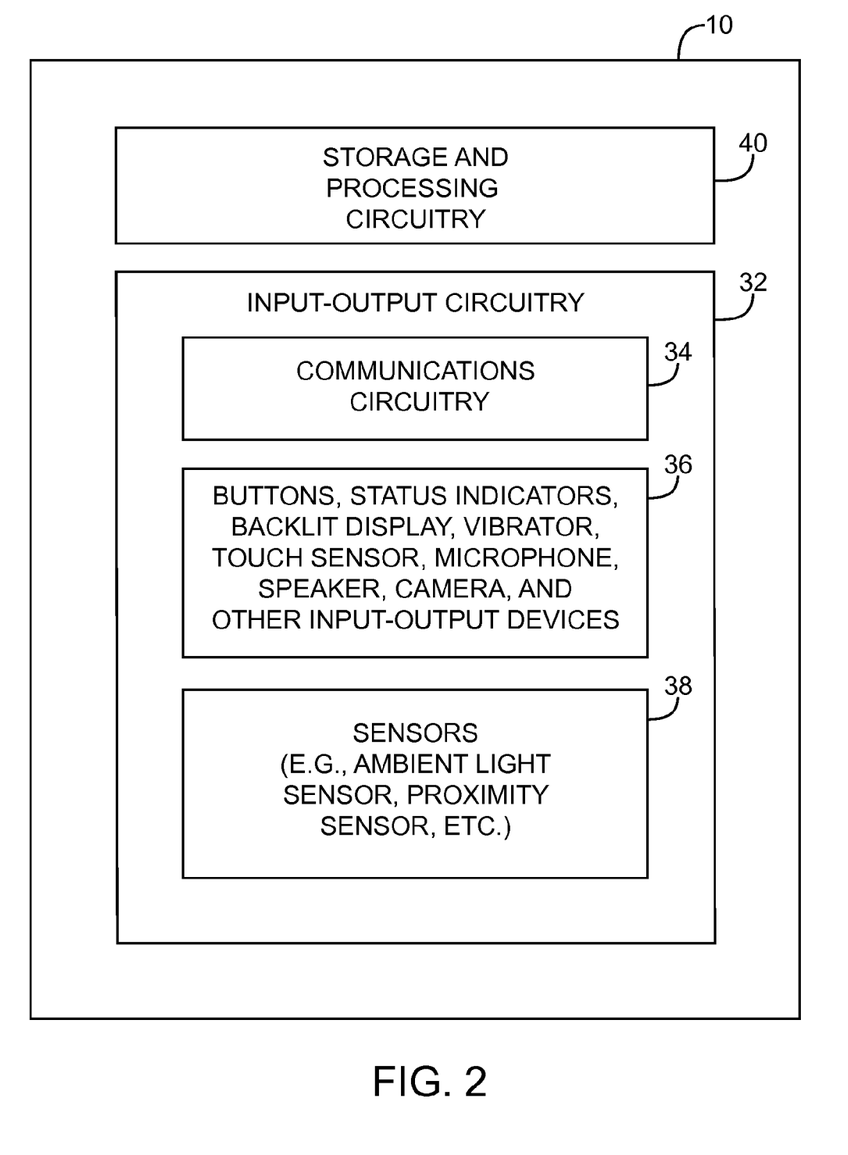
FIG. 2 is a schematic diagram of an illustrative electronic device with a proximity sensor in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10, such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels such as ambient light sensor 24. Ambient light sensor 24 may include one or more semiconductor detectors (e.g., silicon-based detectors) or other light detection circuitry. Sensors 38 may also include proximity sensor components. Sensors 38 may, for example, include a dedicated proximity sensor such as proximity sensor 26 and/or a proximity sensor formed from touch sensors 20 (e.g., a portion of the capacitive touch sensor electrodes in a touch sensor array for display 14 that are otherwise used in gathering touch input for device 10 such as the sensor electrodes in region 22 of FIG. 1). Proximity sensor components in device 10 may, in general, include capacitive proximity sensor components, infrared-light-based proximity sensor components, proximity sensor components based on acoustic signaling schemes, or other proximity sensor equipment. Sensors 38 may also include a pressure sensor, a temperature sensor, an accelerometer, a gyroscope, and other circuitry for making measurements of the environment surrounding device 10.

Figure 3:
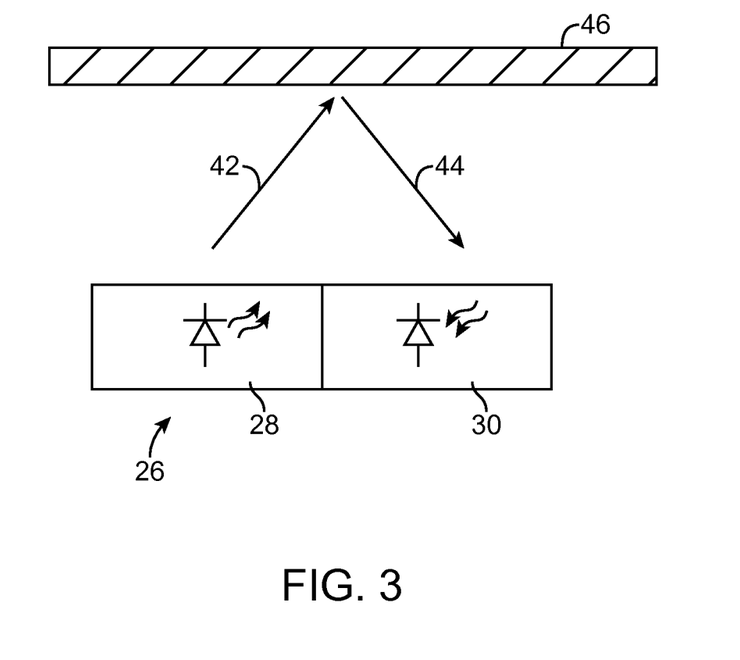
FIG. 3 is a diagram showing how a light-based proximity sensor may have a light source that emits light and a light detector that detects the emitted light following reflection from an external object in accordance with an embodiment of the present invention.

During operation of device 10, device 10 may use proximity sensor 26 to monitor the position of device 10 relative to external objects such as a user's head and can take suitable actions based on an analysis of the proximity sensor data that has been gathered. As shown in FIG. 3, proximity sensor 26 may include light source 28 and light detector 30. Light source 28 may be an infrared light-emitting diode that emits infrared light 42. Light detector 30 may be a photodiode or other semiconductor device that detects light 44 (e.g., light 42 that has reflected from the head of a user or other external object 46). By measuring the magnitude of reflected proximity sensor light 44 at light detector 30, device 10 can determine whether external object 46 is in the vicinity of device 10.

Figure 4:
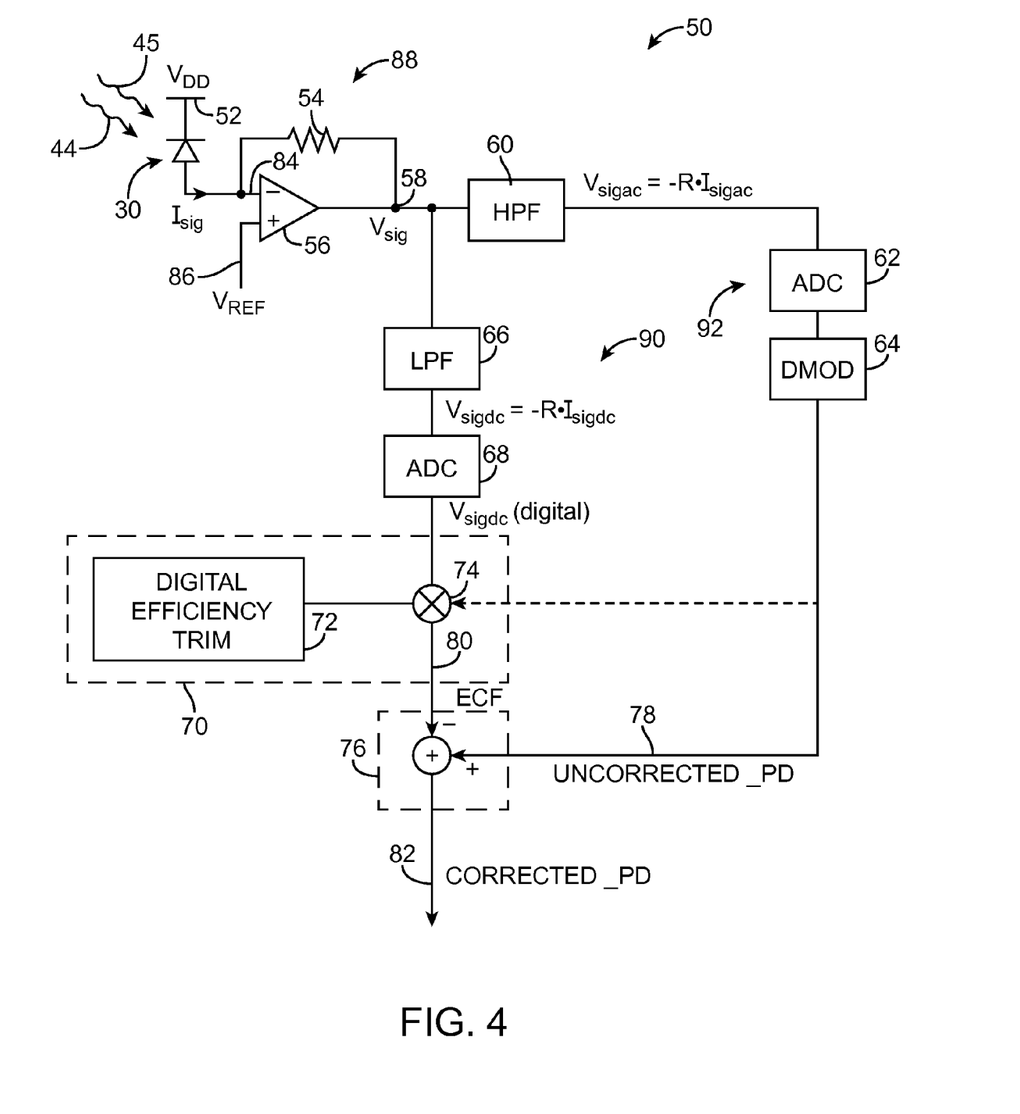
FIG. 4 is a circuit diagram of a proximity sensor processing circuit in accordance with an embodiment of the present invention.

Proximity sensor circuitry of the type that may be used in processing proximity sensor signals is shown in FIG. 4. As shown in FIG. 4, proximity sensor circuitry 50 may be used to process signals gathered by photodiode 30 (or other suitable photodetector). Photodiode 30 may be configured to receive light-emitting diode light 44 and ambient light 45. Light-emitting diode light 44 may be produced by light-emitting diode 28 (FIG. 3). Ambient light 45 may be produced by sunlight and electrical lighting in the vicinity of device 10. Ambient light 45 typically has low (DC) frequencies and is sometimes referred to as DC light. Light source 28 may produce AC light 42 that is modulated with an alternating current (AC) waveform (e.g., a 1-1000 kHz sine wave or AC waveforms at other suitable frequencies). As a result, the frequency of AC light 44 is generally significantly larger than DC ambient light 45. This allows filter circuitry in circuitry 50 to extract the proximity sensor signal that corresponds to reflected light 44 from background light 45.

Photodiode 30 may have a first terminal coupled to power supply 52 (powered by a power supply voltage Vdd) and a second terminal coupled to negative input 84 of amplifier 56. Positive input 86 of amplifier 56 may be configured to receive a reference voltage Vref. Feedback resistor 54 may be coupled between output node 58 of amplifier 56 and input 84, thereby forming transimpedance amplifier 88. Transimpedance amplifier 88 serves as a current-to-voltage signal converter that converts photodiode current Isig into a corresponding voltage Vsig on node 58.

Isig has both AC and DC components. The AC component of Isig (called Isigac) is proportional to AC light 44 from light source 28 that has reflected off of object 46 (FIG. 3) and that has been detected by photodiode 30. The DC component of Isig (called Isigdc) is proportional to DC light 45. The magnitude of signal Isigac is representative of the proximity of external object 46 to device 10 and may sometimes be referred to as a proximity sensor signal. The magnitude of signal Isigdc is associated with the amount of ambient light in the vicinity of device 10 and is therefore filtered out of Isig using circuitry 50. The magnitude of Isigdc can also be used as an input to a correction circuit that corrects Isigac for changes in photodiode efficiency that results from changes in DC ambient light levels.

Voltage Vsig on node 58 has a DC component Vsigdc that is proportional to Isigdc and has an AC component Vsigac that is proportional to Isigac. As shown in FIG. 4, circuitry 50 may contain parallel first and second branches such as branch 90 and branch 92 that are coupled to node 58 at one end and to correction circuit 76 at an opposing end. Branch 90 may include a high pass filter such as high pass filter 60. Voltage Vsig is received by the input of high pass filter 60. High pass filter 60 has a cut-off frequency that is configured to block the DC component of Vsig (i.e., Vsigdc) while passing the AC component of Vsig (i.e., Vsigac). Analog-to-digital converter 62 in branch 92 may be used to covert Vsigac from an analog voltage to a digital representation of the analog voltage. Demodulator 64 may be used to convert the peak voltages in the digital version of AC signal Vsigac to a DC (digital) signal representative of the magnitude of AC light 44 that has been received by photodiode 30. The signal at the output of modulator 64 is uncorrected for sources of error such as ambient-light-induced changes in photodetector efficiency and temperature-induced changes in photodetector efficiency and may therefore sometimes be referred to as an uncorrected photodiode signal (UNCORRECTED_PD in FIG. 4).

Branch 90 of circuitry 50 may be used to extract the DC component of signal Vsig and to use this signal in generating an error correction signal (error correction factor ECF). Low pass filter 66 in branch 90 may have a cutoff frequency that allows DC signals such as Vsigdc to pass while blocking AC signals such as Vsigac, thereby allowing low pass filter 66 to extract Vsigdc from Vsig. Analog-to-digital converter 68 may convert the analog version of Vsig into a corresponding digital version of Vsig called Vsigdc (digital).

Efficiency correction factor generator 70 may receive the DC and AC components of the photodiode signal from the output of analog-to-digital converter 68 and demodulator 64 as inputs and may produce a corresponding scaled output (efficiency correction factor) ECF. The efficiency of photodiode 30 tends to increase with increasing DC current (due to increasing ambient light 45). If not taken into account, the variability of the efficiency of photodiode 30 will make the AC proximity sensor signal that is extracted from photodiode 30 inaccurate.

As shown in FIG. 4, a digital efficiency trim value for efficiency correction factor generator circuit 70 may be stored in storage 72. This trim value may be used as an input to circuit 74 (e.g., a digital multiplier or other scaling circuitry) to adjust the ratio between input Vsigdc (digital) and output ECF. The ratio between Vsigdc (digital) and ECF is preferably selected so that ECF can be used to remove the impact on photodiode efficiency that is experienced by photodiode 30 as a function of ambient light exposure 45. Signal ECF may also be made proportional to signal UNCORRECTED_PD so that more correction is applied to larger UNCORRECTED_PD signals. Signal ECF may be provided to the negative input of correction circuit 76 (e.g., an adder or other combiner). Signal UNCORRECTED_PD may be supplied to the positive input of correction circuit 70. Correction circuit 70 may correct signal UNCORRECTED_PD by applying efficiency correction factor ECF. In this way, the DC-photodiode-current dependence of photodiode efficiency can be removed from signal UNCORRECTED_PD to produce corrected signal CORRECTED_PD on line 82. Signal CORRECTED_PD can serve as accurate ambient-light-corrected proximity sensor data for use in operating electronic device 10.

Figure 5:
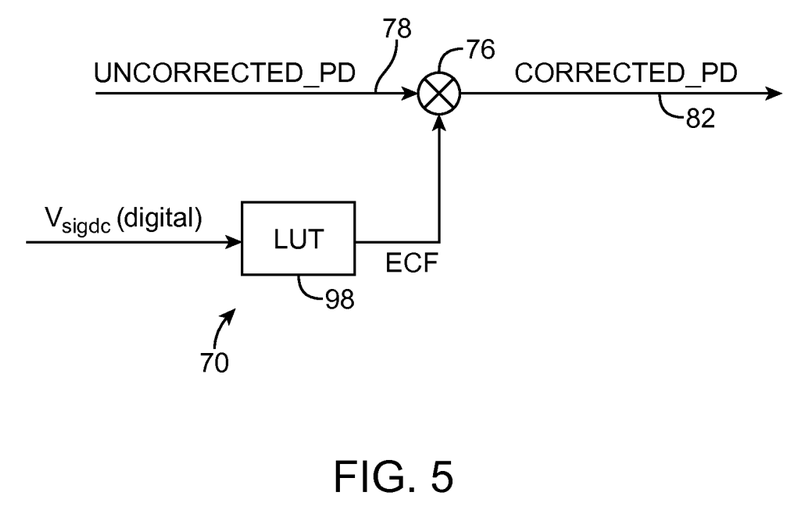
FIG. 5 is a circuit diagram of a circuit based on a look-up table for correcting photodiode signals to remove efficiency variations due to changes in direct current photodiode current in accordance with an embodiment of the present invention.

As shown in FIG. 5, signal Vsigdc (digital) may, if desired, be processed using an efficiency correction factor generator 70 that is based on digital circuitry such as look-up table 98. Look-up table 98 may contain entries that map a set of expected Vsigdc (digital) values to a corresponding set of correction factor signals ECF. In effect, the functions of digital efficiency trim value 72 of FIG. 4 and the associated scaling function of circuit 74 of FIG. 4 may be embodied into the entries of table 98. During operation, correction circuit 76 may apply efficiency correction factor ECF to signal UNCORRECTED_PD on line 78 to produce accurate ambient-light-corrected proximity sensor data (signal CORRECTED_PD) on line 82.

Figure 6:
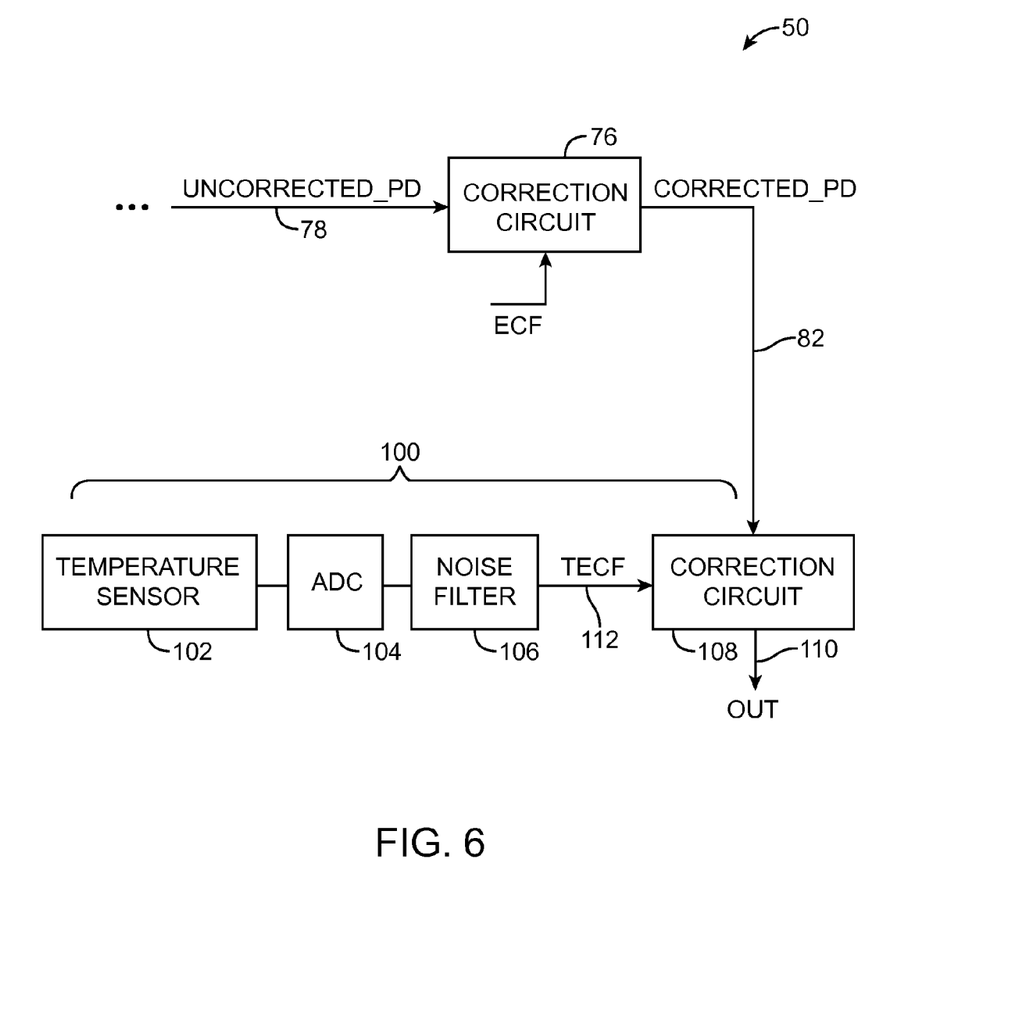
FIG. 6 is a circuit diagram of a circuit for correcting photodiode signals to remove efficiency variations due to changes in ambient temperature in accordance with an embodiment of the present invention.

As shown in FIG. 6, circuitry 50 may, if desired, include temperature correction circuitry 100. Temperature correction circuitry 100 may be used to correct for temperature-induced changes in light-emitting diode efficiency for light-emitting diode 28.

Temperature correction circuitry 100 may include a temperature sensor such as temperature sensor 102 for use in monitoring the ambient temperature of device 10. Temperature sensor 102 may produce an analog output that is received by analog-to-digital converter 104. Analog-to-digital converter 104 may provide a digital version of the temperature signal measured by temperature sensor 102 to an optional filter circuit such as noise filter 106 (e.g., an averaging circuit).

The output of noise filter 106 represents a correction factor based on the temperature measured by temperature sensor 102 and is applied to input 112 of correction circuit 108. If desired, scaling circuitry and/or a look-up table such as look-up table of FIG. 5 may be used to ensure that the magnitude of temperature efficiency correction factor TECF that is produced on line 112 is appropriate for correcting CORRECTED_PD for light-emitting diode efficiency changes induced by temperature changes. The look-up table or other scaling circuit may, for example, be interposed between noise filter 106 and correction circuit 108 or may be incorporated into circuitry 106.

During operation, correction circuit 108 may receive ambient-light-corrected proximity sensor signal CORRECTED_PD on line 82 and may provide a corresponding temperature-corrected output signal OUT on line 110 based on light-emitting diode temperature efficiency correction factor TECF on path 112.

In the example of FIG. 6, both temperature-based light-emitting-diode-efficiency-change corrections and ambient-light-based photodiode efficiency change corrections have been made using circuitry 50. This is merely illustrative. Proximity sensor signal processing circuitry such as circuitry 50 may be provided with only ambient-light-based photodiode efficiency compensation circuitry or may be provided with only temperature-based light-emitting-diode efficiency compensation circuitry. Additional types of correction circuitry (e.g., circuitry for correcting for other changes in photodiode efficiency due to fluctuations in operating conditions) may be included in circuitry 50, if desired.

The foregoing is merely illustrative of the principles of this invention and various modifications can be made by those skilled in the art without departing from the scope and spirit of the invention. The foregoing embodiments may be implemented individually or in any combination.

What is claimed is:

1. A light-based proximity sensor, comprising:
   a light source that emits light towards an external object;
   a photodetector that is configured to measure light from the light source that has reflected off of the external object;
   an ambient light correction circuit that corrects signals from the photodetector for photodetector efficiency changes due to changes in how much ambient light is received by the photodetector; and
   an efficiency correction factor generator interposed between the photodetector and the ambient light correction circuit, wherein the ambient light correction circuit comprises a first input that receives an efficiency correction factor signal from the efficiency correction factor generator and a second input that receives an uncorrected photodetector signal from the photodetector.

2. The light-based proximity sensor defined in claim 1 further comprising a temperature correction circuit that corrects signals from the photodetector for light-emitting-diode efficiency changes due to changes in temperature.

3. The light-based proximity sensor defined in claim 1 wherein the light source comprises a light-emitting diode that emits an alternating current infrared light signal.

4. The light-based proximity sensor defined in claim 1 further comprising a low pass filter interposed between the photodetector and the ambient light correction circuit.

5. The light-based proximity sensor defined in claim 1 further comprising a transimpedance amplifier that receives a signal from the photodetector and that outputs a corresponding voltage signal on a node.

6. The light-based proximity sensor defined in claim 5 further comprising first and second circuit branches coupled to the node, wherein the first circuit branch includes a low pass filter and extracts a direct current signal from the voltage signal on the node and wherein the second circuit branch includes a high pass filter and extracts an alternating current signal from the voltage signal on the node.

7. The light-based proximity sensor defined in claim 6 wherein the first and second circuit branches include respective first and second analog-to-digital converters.

8. The light-based proximity sensor defined in claim 6 wherein the ambient light correction circuit receives a signal from the first circuit branch that is proportional to the direct current signal and receives a signal from the second circuit branch that is proportional to the alternating current signal.

9. The light-based proximity sensor defined in claim 6 wherein the first circuit branch includes a storage circuit that stores a digital efficiency trim value and a scaling circuit configured to scale the extracted direct current signal based on the stored digital efficiency trim value.

10. The light-based proximity sensor defined in claim 6 wherein the first branch includes a look-up table that receives the extracted direct current signal and that provides a corresponding output signal to the ambient light correction circuit.

11. A light-based proximity sensor, comprising:
a light-emitting diode that is configured to emit light towards an external object;
a photodetector that is configured to measure light from the light-emitting diode that has reflected off of the external object;
a low-pass filter that extracts only a direct current component from a photodetector signal from the photodetector;
a high-pass filter that extracts only an alternating current component from the photodetector signal;
an efficiency correction factor generator that generates an efficiency correction factor based on the direct current component;
an ambient light correction circuit that receives the efficiency correction factor and the alternating current component and generates a corresponding corrected photodetector signal; and
a temperature correction circuit that corrects the corrected photodetector signal from the ambient light correction circuit for light-emitting diode efficiency changes due to changes in temperature of the light-emitting diode.

12. The light-based proximity sensor defined in claim 11 wherein the temperature correction circuit has a first input that receives the corrected photodetector signal and a second input that receives a temperature efficiency correction factor that is applied to the corrected photodetector signal by the temperature correction circuit.

13. The light-based proximity sensor defined in claim 12 further comprising a temperature sensor that gathers temperature measurements.

14. The light-based proximity sensor defined in claim 13 further comprising an analog-to-digital converter that converts the temperature measurements into digital temperature signals, wherein the temperature efficiency correction factor is proportional to the temperature measurements.

15. Proximity sensor circuitry, comprising:
a photodiode that is configured to receive an alternating current light signal emitted by a light-emitting diode and reflected from an external object and that is configured to receive a direct current ambient light signal;
a transimpedance amplifier that produces a photodiode signal having an alternating current component associated with the alternating current light signal and a direct current component associated with the direct current ambient light signal;
a first filter that extracts the alternating current component;
a second filter that extracts the direct current component; and
a correction circuit with a first input that receives the alternating current component and a second input that receives the direct current component, wherein the correction circuit is configured to produce a corresponding corrected photodiode signal that is corrected for efficiency changes due to fluctuations in how much ambient light is received by the photodiode.

16. The proximity sensor circuitry defined in claim 15 wherein the first filter comprises a high pass filter, the proximity sensor circuitry further comprising an analog-to-digital converter and demodulator interposed between the high pass filter and the correction circuit.

17. The proximity sensor circuitry defined in claim 15 wherein the second filter comprises a low pass filter, the proximity sensor circuitry further comprising an analog-to-digital converter and a look-up table interposed between the low pass filter and the correction circuit.

18. The proximity sensor circuitry defined in claim 15 wherein the second filter comprises a low pass filter, the proximity sensor circuitry further comprising an analog-to-digital converter and an efficiency correction factor generator interposed between the low pass filter and the correction circuit.

19. The proximity sensor circuitry defined in claim 15, wherein the first filter extracts only the alternating current component, and wherein the second filter extracts only the direct current component.

\* \* \* \* \*